United States Patent [19]
Ruetz et al.

[11] Patent Number: 5,574,666
[45] Date of Patent: Nov. 12, 1996

[54] COLOR PRINTING METHOD AND APPARATUS USING GAMUT MAPPING IN MUNSELL SPACE

[75] Inventors: Brigitte Ruetz, San Bruno; Gesualdo Alesii, San Jose; Timothy I. Kohler, Mountain View, all of Calif.

[73] Assignee: Canon Information Systems, Inc., Costa Mesa, Calif.

[21] Appl. No.: 242,234

[22] Filed: May 13, 1994

[51] Int. Cl.$^6$ .................................................... G03F 3/08
[52] U.S. Cl. ........................ 364/526; 358/518; 358/520; 345/187; 395/101
[58] Field of Search .................................... 364/526, 514; 358/518, 519, 520, 504, 523; 345/186, 187, 199; 395/101, 131

[56] References Cited

U.S. PATENT DOCUMENTS

| | | | |
|---|---|---|---|
| 3,825,673 | 7/1974 | Schreiner et al. | 178/5.4 HE |
| 4,620,792 | 11/1986 | Suga | 356/402 |
| 4,751,535 | 10/1986 | Myers | 346/157 |
| 4,941,038 | 7/1990 | Walowit | 358/80 |
| 5,185,661 | 2/1993 | Ng | 358/75 |
| 5,231,504 | 7/1993 | Magee | 358/75 |

(List continued on next page.)

FOREIGN PATENT DOCUMENTS

| | | |
|---|---|---|
| 448250 | 9/1991 | European Pat. Off. . |
| 570139 | 11/1993 | European Pat. Off. . |
| 592146 | 4/1994 | European Pat. Off. . |

OTHER PUBLICATIONS

Hansen, "Breaking the Color Barrier", *Computer Graphics World*, Jul., 1990.
Hunt et al., "High Quality Inkjet Color Graphics Performance on Plain Paper", *HP Journal*, Feb., 1994.
Seybold, "The Challenge of Color Imaging", *Seybold Report on Desktop Publishing*, Nov. 2, 1992.
Kimball, "color Fundamentals", *Document Image Automation*, Mar. 1991.
Joann M. Taylor, "Integrated color management: the key to color control in electronic imaging and graphic systems", SPIE Proceedings, Image Handling And Reproduction Systems Integration (1991), vol. 1460, pp. 2–10.
George H. Joblove, et al., "Color spaces For Computer Graphics", vol. 12, No. 3, Aug. 1978, pp. 20–27.
E. M. Granger, "ATD, Appearance Equivalence, and Desktop Publishing", SPIE Proceedings, Device–Independent Color Imaging (1994), vol. 2170, pp. 163–168.
"Final Report of the O.S.A. Subcommittee On the Spacing of the Munsell Colors", S. M. Newall et al., Journal of the Optical Soc. of Am., vol. 33, No. 7, Jul. 1943.
"Color Gamut Mapping Techniques For Color Hard Copy Images", Toru Hoshino et al., preprint to SPIE proceedings, 1993.

*Primary Examiner*—Emanuel T. Voeltz
*Assistant Examiner*—Patrick J. Assouad
*Attorney, Agent, or Firm*—Fitzpatrick, Cella, Harper & Scinto

[57] ABSTRACT

A method and apparatus for constructing a color printer table. Printable colors in CIELAB space are transformed to Munsell space and color mapping functions are derived which map Munsell space coordinates into primary color coordinates CMY of the printer. A Munsell printer gamut is determined by selecting points in Munsell space where the color mapping functions result within the printable primary color range. All discrete points of an extended gamut in CIELAB space are mapped into the Munsell space. The extended gamut comprises colors inside the printer gamut as well as colors outside the printer gamut, such as colors typically found in a color monitor. Primary color values are inserted into the color printer table by taking the mapped CIELAB points and applying the color mapping functions to the mapped CIELAB points that lie inside the Munsell printer gamut, and applying gamut mapping to the mapped CIELAB points in Munsell space that lie outside the Munsell printer gamut. Since the gamut mapping takes place in Munsell space, the hue is exactly preserved by simply preserving the hue angle.

48 Claims, 15 Drawing Sheets

U.S. PATENT DOCUMENTS

| | | | |
|---|---|---|---|
| 5,237,409 | 8/1993 | Yamaguchi | 358/133 |
| 5,237,517 | 8/1993 | Harrington et al. | 364/526 |
| 5,239,370 | 8/1993 | Yamaguchi | 358/518 |
| 5,243,414 | 9/1993 | Dalrymple et al. | 358/500 |
| 5,255,350 | 10/1993 | Hermann et al. | 395/109 |
| 5,257,097 | 10/1993 | Pineau et al. | 358/500 |
| 5,268,754 | 12/1993 | Van de Capelle et al. | 358/527 |
| 5,282,046 | 1/1994 | Yamaguchi | 358/296 |
| 5,287,122 | 2/1994 | Vachon | 346/1.1 |
| 5,293,258 | 3/1994 | Dattilo | 358/518 |
| 5,299,291 | 3/1994 | Ruetz | 395/109 |
| 5,317,425 | 5/1994 | Spence et al. | 358/504 |
| 5,323,249 | 6/1994 | Liang | 358/518 |
| 5,343,311 | 8/1994 | Morag et al. | 358/518 |
| 5,377,025 | 12/1994 | Spaulding et al. | 358/518 |
| 5,416,890 | 5/1995 | Beretta | 395/131 |

5,574,666

COLOR PRINTING METHOD AND APPARATUS USING GAMUT MAPPING IN MUNSELL SPACE

BACKGROUND OF THE INVENTION

1. Field of the Invention

The present invention pertains to a method and apparatus for building and using look-up tables which determine the colors that a color printer prints in response to requests to print specific colors. The specific colors requested to be printed may include colors that are not printable by the printer. For those colors in particular, gamut mapping is performed in Munsell color space where hue planes are straight, i.e. not curved, so as to compensate for the Abney effect and to preserve the perceived hue.

2. Description of the Related Art

Recently, as the availability of color monitors and color printers has increased, it is more and more commonplace for a computer user to view a full color image on a color monitor and then to request a full color printout of that image on a color printer.

However, color printers and color monitors form color images differently. Specifically, a color monitor is a light emitting device; colors are formed on color monitors by adding light from three color primaries, generally, red, green and blue. Printed images, on the other hand, simply reflect ambient light; colors are perceived by the way ambient light is affected by three subtractive primaries, generally cyan, magenta and yellow (and sometimes black).

These processes are fundamentally different. As a result, the range of colors displayable on the monitor is different from the range of colors printable by a printer. FIG. 1 is the CIE 1931 chromaticity diagram showing the range (or "gamut") of colors displayable by a monitor (area "A") and the range (or "gamut") of colors printable by a printer (area "B"). As seen in FIG. 1, the range of colors displayable on a monitor is generally greater than the range of colors printable by a printer. This is because a monitor is a light emitting device and is able to display colors with greater saturation. There are, however, some low saturation areas such as at area 10 where a printed image, which is light-subtractive, has greater color range than a monitor.

Because of the difference between the ranges of printable and displayable colors, it has not heretofore been possible to print color images which are perceived as faithful reproductions of displayed color images. Specifically, it is simply not possible to print a color in areas like out-of-gamut area 11 which are outside the range "B" of printable colors. Accordingly, even though those colors may be seen on color monitors, they cannot be printed on a color printer.

In U.S. Pat. No. 4,941,038, out-of-gamut colors are adjusted to printable colors within the printer gamut by selecting the printable color which has the shortest vector distance from the unprintable color and which preserves the hue angle of the unprintable color. Experiments and observations on human color perception, however, have shown that a line representing a constant hue or color drawn from pure white out to the fully saturated color is not a straight line but rather is a curved line. The curvature of those lines (the so-called "Abney Effect") is shown in the chromaticity diagram of FIG. 2. For regions where the curvature of constant hue lines is relatively low, like bluish-green region 18, preserving hue angle only slightly changes the perceived hue. Thus, preserving hue angle for the bluish-green out-of-gamut color 18a by extending the hue back to point 18b on the printer gamut border 10 still prints a bluish-green color. But for regions where the curvature of constant color lines is relatively high, like purplish-blue region 19, preserving hue angle greatly affects perceived hue. Thus, preserving hue angle for the blue out-of-gamut color 19a by extending hue back to point 19b on the printer gamut border 10 prints a color with a decidedly purplish-blue hue.

Since each out-of-gamut color was adjusted independently, out-of-gamut colors are printed with poor color smoothness, where small changes in commanded color can result in large changes in printed color. In particular circumstances, poor color smoothness manifests itself as non-monotonic changes in luminance whereby the lightnesses of out-of-gamut colors does not increase smoothly and monotonically from dark to light but rather dips occasionally from light to dark. This results in a situation where colors which should merge smoothly and monotonically from dark to light in fact show undesirable bands of darkness.

In U.S. Pat. No. 5,299,291, which is assigned to the assignee of the present invention, to compensate for the Abney effect the hue angles in the printer table and border table are warped, and out-of-gamut colors are adjusted to printable colors within the printer gamut by building-printer tables which produce colors which vary smoothly in the out-of-gamut regions and exhibited monotonic increases in lightnesses. Transition colors are gamut mapped at a constant angle to colors of the same hue on the border of the printer gamut. However, since the gamut mapping is per, formed in CIELAB space, it is not easy to see which colors are of the same hue because the hue planes are slightly curved (the Abney effect). This can be seen in FIG. 3, where the gradation of colors of the same hue from white to a fully saturated color are shown projected into the a* b* plane at a Constant L*. The curved hue planes in CIELAB space are 5R (red), 5Y (yellow), 5G (green), 5B (blue) and 5P (purple), which are shown as curved lines. The warping computations in CIELAB space are inexact and time consuming. The contents of U.S. Pat. No. 5,299,291 are incorporated herein by reference.

SUMMARY OF THE INVENTION

It is an object of the present invention to address the foregoing difficulties and to provide printer tables whose perceived hue is preserved and whose colors vary smoothly in the out-of-gamut regions by performing gamut mapping in Munsell space where the hue planes are straight. Munsell space is shown in FIG. 4 where hue planes 5R, 5Y, 5G, 5B and 5P are shown projected into the U W plane at a constant value V as straight lines. Munsell coordinates are normally cylindrical coordinates H, V, C, but are shown in cartesian coordinates for a clearer understanding.

The printer tables are derived once by a manufacturer, to be used in a printer driver which is sold to end users as part of a printer.

According to this aspect, the invention is a method and apparatus for building a printer table and a border table which give CMY values that are printed in response to a command to print a color. The CMY values inserted into the respective tables are determined in Munsell space. Since the gamut mapping takes place in Munsell space, the hue is exactly preserved by simply preserving the hue angle, and out-of-gamut colors vary smoothly and exhibit monotonic increase in lightnesses for increasingly lighter out-of-gamut colors.

This is accomplished by transforming measurements of printable colors to Munsell space. Color mapping functions are derived which map Munsell space coordinates into CMY coordinates. A Munsell printer gamut is determined by selecting points in Munsell space where the color mapping functions result within the printable CMY color range. All discrete points of an extended gamut in CIELAB space are mapped into the Munsell space. The extended gamut comprises colors within the printer gamut as well as colors outside the printer gamut such as colors typically found in a color monitor. CMY values are inserted into the color printer table by taking the mapped CIELAB points and applying the color mapping functions to the mapped CIELAB points that lie inside the Munsell printer gamut, and applying gamut mapping to the mapped CIELAB points in Munsell space that lie outside the Munsell printer gamut. Since the gamut mapping takes place in Munsell space, the hue is exactly preserved by simply preserving the hue angle.

If desired, a border table may be provided for colors outside the extended gamut by mapping border points of the extended gamut, at all discrete angles and lightnesses, into the Munsell space and applying gamut mapping to the mapped CIELAB points in Munsell space.

According to this aspect, color printing is conducted by reference to the printer table and the border table, which give CMY values in response to a command to print a color. The printer table gives CMY values for colors within a printer table domain which consists of rectangular areas surrounding the extended gamut. The border table gives CMY values for colors outside the printer table domain.

This brief summary has been provided so that the nature of the invention may be understood quickly. A more complete understanding of the invention can be obtained by reference to the following detailed description of the preferred embodiment thereof in connection with the drawings.

DETAILED DESCRIPTION OF THE PREFERRED EMBODIMENT

Figure 1:
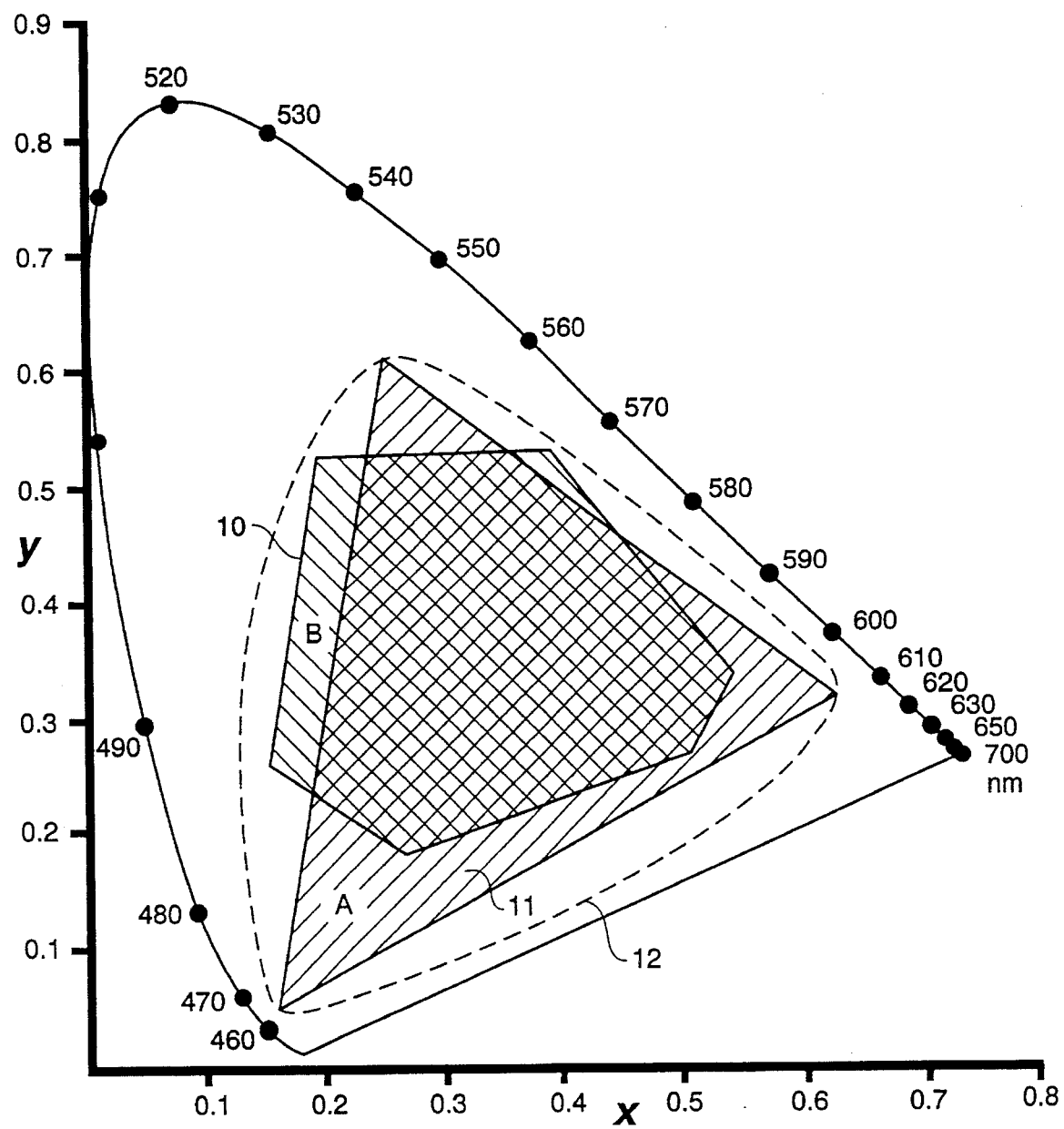
FIG. 1 is a chromaticity diagram showing how the gamut of colors printable on a printer is related to the gamut of colors displayable on a monitor.
Figure 2:
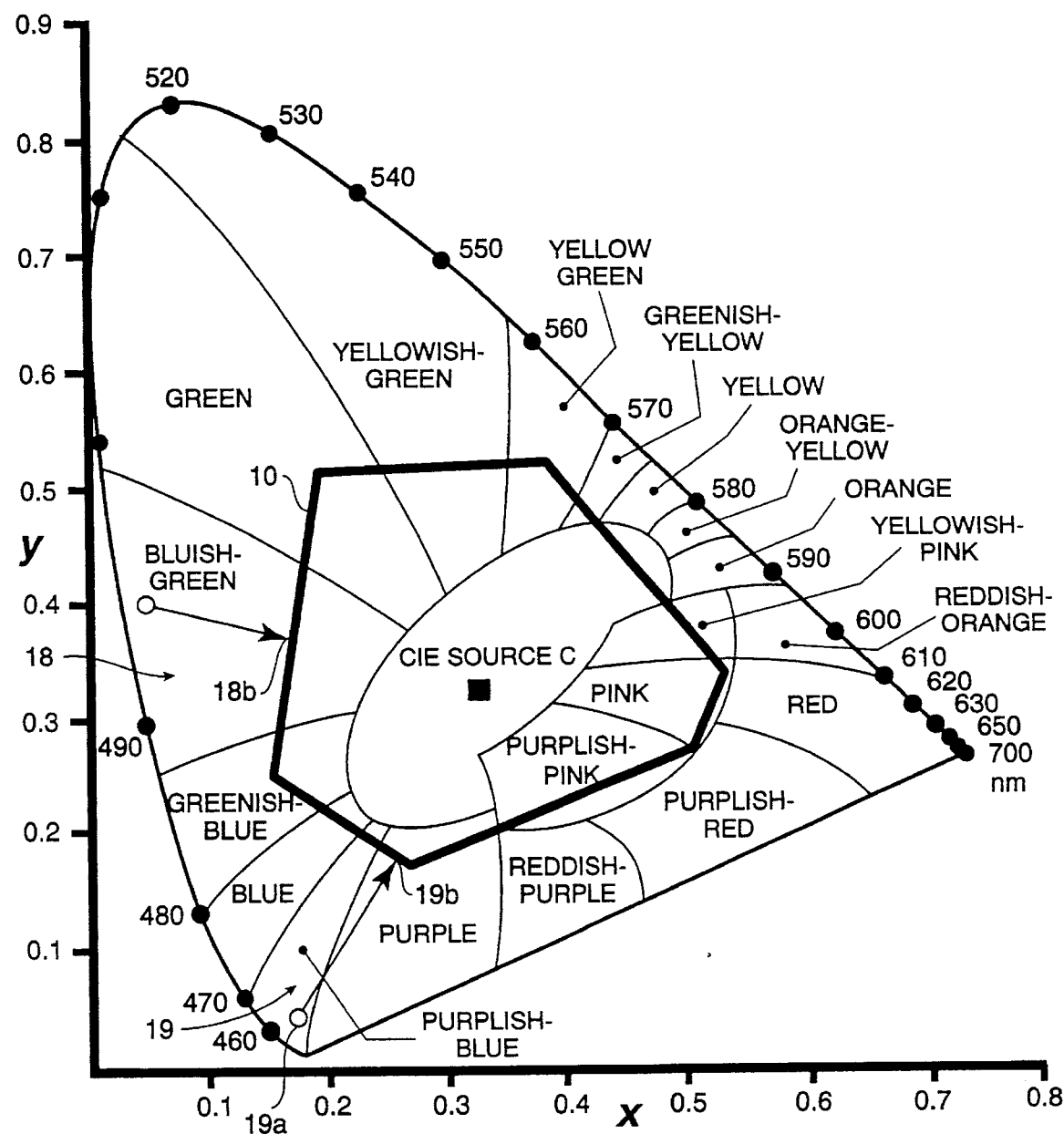
FIG. 2 is a chromaticity diagram showing the curved constant hue lines that characterize the Abney effect.
Figure 3:
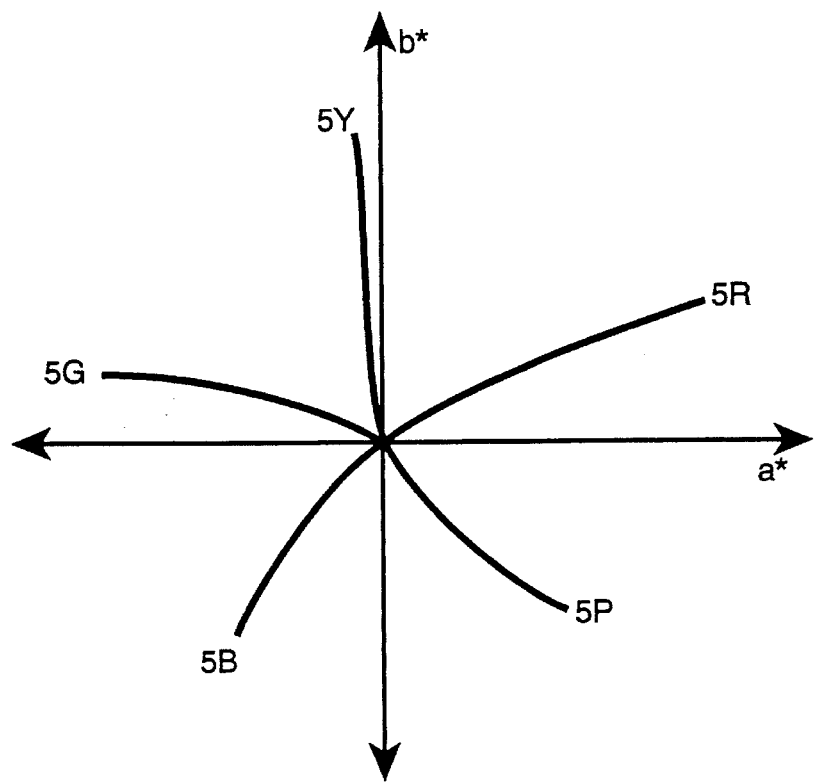
FIG. 3 is a graph illustrating the gradation of colors of the same hue in CIELAB space.
Figure 4:
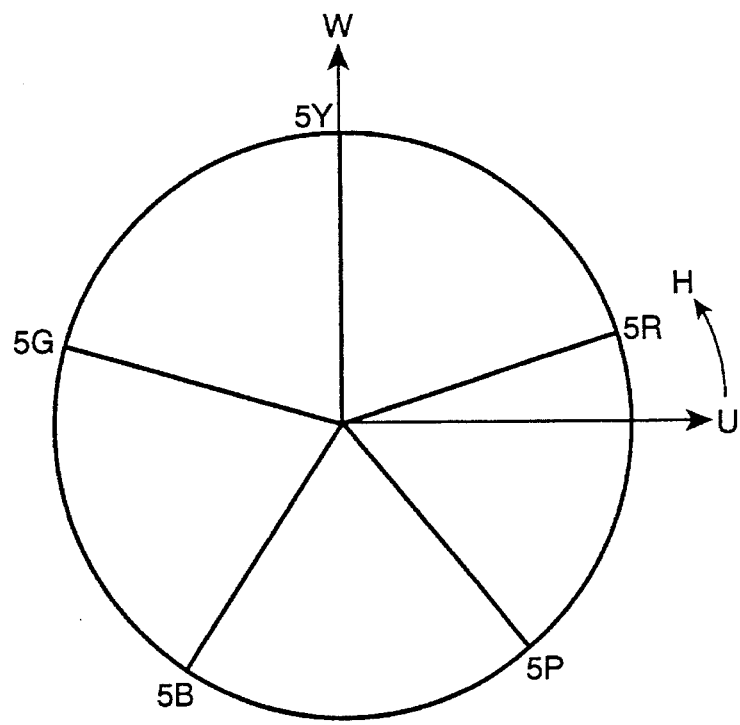
FIG. 4 is a graph illustrating the gradation of colors of the same hue in Munsell space.
Figure 5:
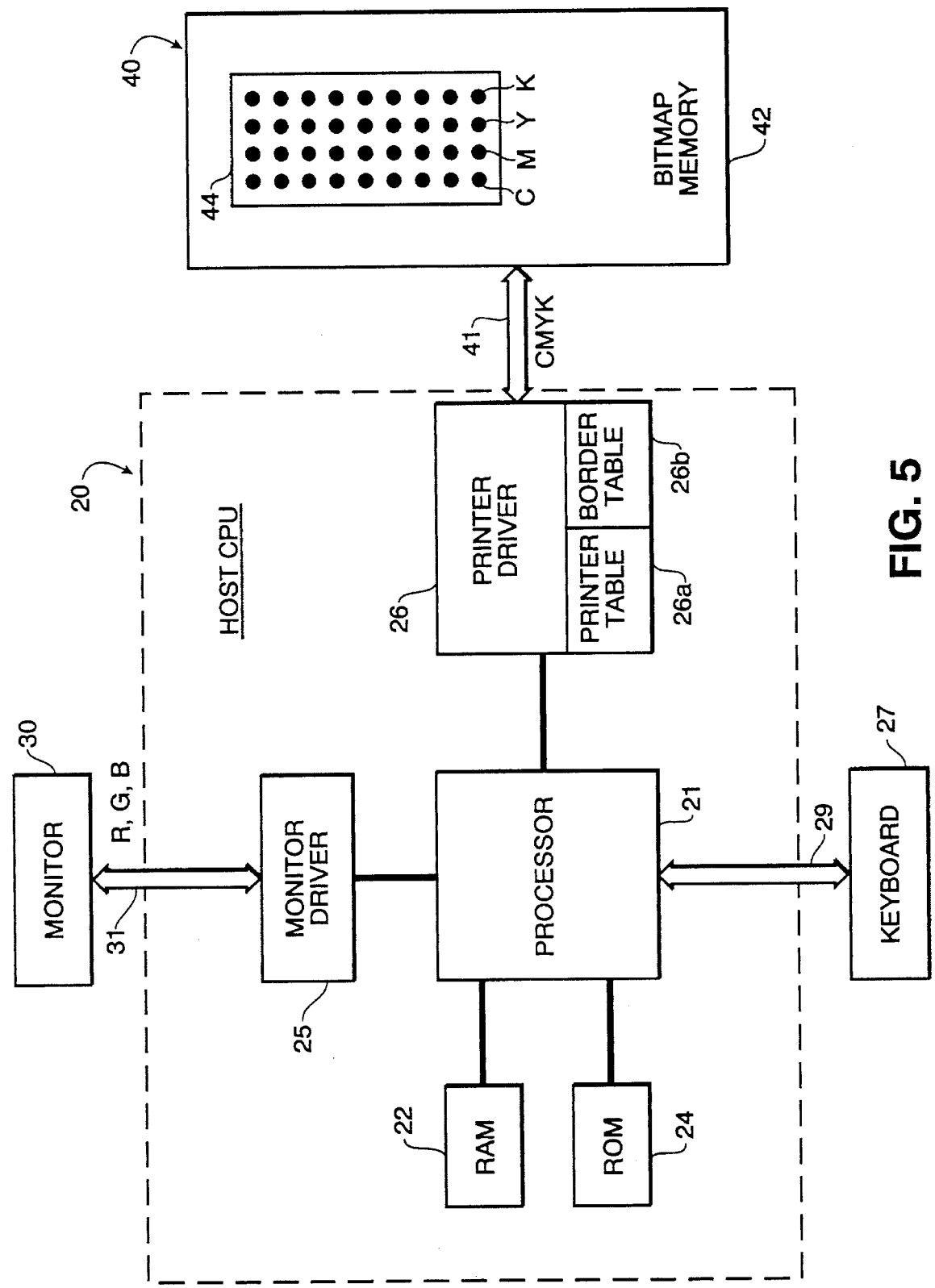
FIG. 5 is a block diagram of a printing apparatus according to the invention.

FIG. 5 is a block diagram of a printing apparatus according to the invention.

As shown in FIG. 5, the printing apparatus includes a host CPU 20, a color monitor 30 and a color printer 40. Host CPU 20 includes a processor 21 such as an 80586 microprocessor, a random access memory ("RAM") 22 which provides working storage area to processor 21, a read only memory ("ROM") 24 which provides static storage for processor 21, monitor driver 25 and a printer driver 26. Host CPU 20 is accessed by an operator via keyboard 27 which is connected through an interface 29 to processor 21. Using the keyboard, an operator can cause processor 21 to execute stored program instructions which cause color images to be displayed on monitor 30 and which cause corresponding color images to be printed on color printer 40.

Other peripheral devices, such as disk drives, tape drives, color video interfaces, color scanner interfaces, etc., may be provided for host CPU 20 but those other devices are not shown in the interest of simplicity. In cooperation with the stored program instructions executed by processor 21, such devices permit, for example, a color image to be scanned into RAM 22 and displayed on monitor 30, the colors in the image to be manipulated, and the resulting image to be printed on printer 40.

In accordance with stored program instructions, processor 21 derives a color image for display on monitor 30. Processor 21 provides the color image to monitor driver 25 which in turn derives RGB values for each pixel in monitor 30. The RGB values are provided via interface 31 to the monitor 30 where those values are displayed.

Upon request, processor 21 also feeds a color image to printer driver 26 for printing by color printer 40. Printer driver 26 derives CMY values for each pixel of the color image based on the color values provided from processor 21. The CMY values are determined in accordance with either the printer table 26a or the border table 26b. The printer table 26a is a table which provides CMY values for all colors that are printable by printer 40. The border table 26b is a table which provides suitable CMY values for colors that are not printable by printer 40. The printer table 26a may also include CMY values for some unprintable colors so as to smooth the transition from printable to unprintable colors. That is, printer table 26a has a domain which includes an extended gamut which includes the printer gamut and a typical color monitor gamut. In addition, a black (hereinafter "K") value may also be derived. The CMYK values are fed via interface 41 to printer 40 where they are stored in bit map memory 42 within printer 40. The bit map memory 42 may store a full bit map image of the printed image or it may store only a band or partial bit map image. When sufficient color data is stored in bit map memory 42, a color printer head 44 reciprocates across a platen adjacent to a sheet of paper. In the present embodiment, print head 44 includes 32 ink jet nozzles which may be arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bit map memory 42 such that in one reciprocation of print head 44 across the platen, eight rows of pixels are printed.

Figure 6:
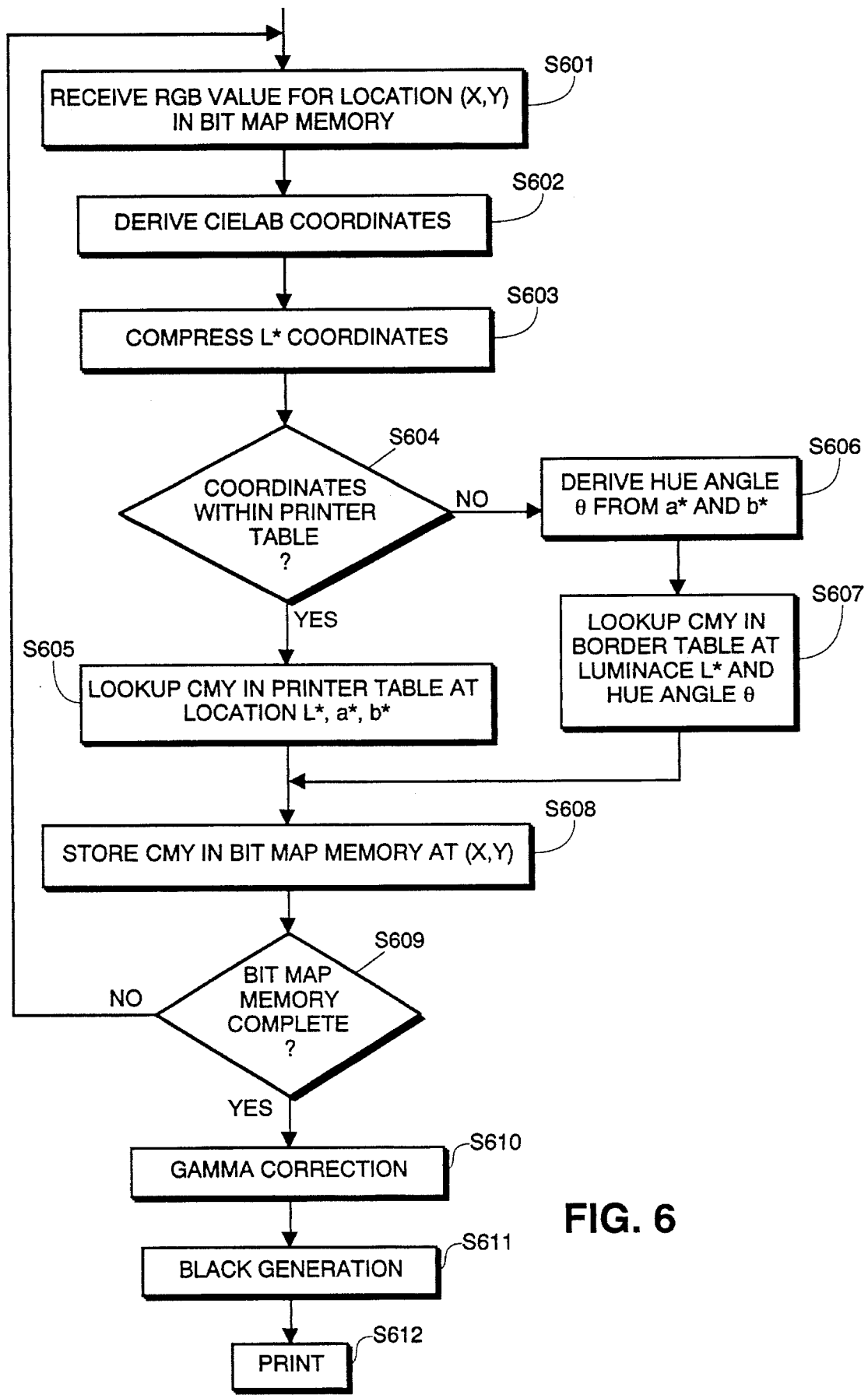
FIG. 6 is a flow diagram showing how a printer driver in the FIG. 6 apparatus selects CMYK values for a color printer.

FIG. 6 is a flow diagram showing how printer driver 26 selects CMYK values from the color data provided by processor 21. In step S601, printer driver 26 receives RGB values for a location (x,y) in bit map memory 42. In step S602, printer driver 26 drives device independent color coordinates from the RGB value. Preferably, the device independent coordinates are CIELAB coordinates. This is because the coordinates in CIELAB space are perceptually uniform such that equal-sized intervals anywhere in CIELAB space correspond to equal-sized changes in perceived color. Furthermore, CIELAB space is one of the standard color spaces utilized in the printing industry.

In step S603, the luminance coordinate is compressed at the extremes of the L* axis in CIELAB space. Compression step S603 may be performed explicitly by mathematical manipulation of the L* value from step S602 or implicitly by storing modified CMY values in the printer table and the border table. If performed implicitly, which is preferable in some instances, then both the printer table and the border table store pre-compressed values. More particularly, the printer table and the border table can be arranged so that the values stored at, for example, luminance L*=99 actually correspond to a luminance of L*=94. Likewise, values stored at, say, luminance L*=7 actually correspond to a luminance of L*=26. Values in the center of the luminance range, from for example L*=38 through 90, remain unmodified. This arrangement results in luminance compression without the need for explicit compression.

While compression step S603 is optional, it is nevertheless preferable to perform since it ensures that colors at extreme values of luminance are printed with perceptible changes in luminance. More particularly, because monitor 30 displays colors with light emitting elements, it can display colors with higher values of luminance then those achievable by printer 40, whose highest value of luminance is limited by the whiteness of the paper upon which the color image is formed. Further still, since monitor 30 can completely turn off its light emitting elements, it can display colors with lower values of luminance than those printable by printer 40, since even black ink reflects some ambient light. Accordingly, to ensure that some color is printed, even at the highest and lowest luminance values, it is preferable to compress the luminance values determined in step S602 into a range that is printable by printer 40.

In step S604, the L*, a* and b* coordinates derived in steps S602 and S603 are inspected to determine whether they fall within the range covered by printer table 26a. If the L*, a*, b* coordinates are within the range covered by printer table 26a, then flow advances to step S605 which looks up the corresponding CMY values in printer table 26a at location L*, a*, b, (actually, the nearest location since only discrete values of L*, a* and b* are stored). On the other hand, if the L*, a*, b* coordinates are not within the printer table 26a, then flow advances to step S606 in which the hue angle θ is derived from the a* and b* values according to the following formula:

θ=arctan (b*/a*)

Flow then advances to step S607 which looks up corresponding CMY values in border table 26b at the nearest location which corresponds to the luminance L* and the hue angle derived in step S606.

In either event, flow then advances to step S608 in which the CMY values are stored in bit map memory 42 at location (x,y). If desired, the CMY values may be modified before storage, for example, by interpolation, so as to accommodate the difference between the actual L*, a*, b* values stored in the tables and the desired values calculated above.

In step S609, printer driver 26 determines whether the bit map memory has been completed. If the bit map memory has not been completed, then flow returns to step S601 in which the next RGB value is received for the next location (x,y) in bit map memory. On the other hand, if the bit map memory has been completed, or if a sufficient area of the bit map memory has been completed (such as an eight row long band corresponding to the eight rows of ink jet nozzles in head 44), then flow advances to step S610 where gamma correction is performed. Gamma correction adjusts the CMY values in the bit map memory so as to achieve a uniform distribution of luminance. In step S611, undercolor removal in the present embodiment may be performed by the simple expedient of selecting the minimum value of CMY and assigning that value to the black value. Then, each of the CMY values is adjusted by subtracting the black value from it.

The order of steps S610 and S611 is not critical and those steps may be switched, for example to accommodate a particular color printing technique such as continuous tone, dither techniques or error diffusion.

In step S612, color printing is initiated using the resulting CMYK values.

Figure 7:
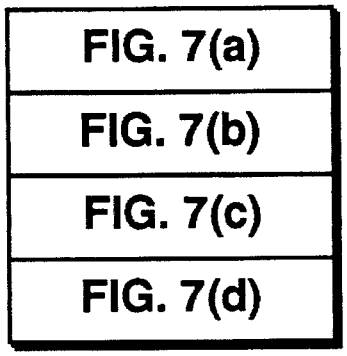
FIGS. 7(a)–7(d) when taken together as shown in FIG. 7, comprise a flow diagram for describing how the printer table and the border table are constructed.
Figure 7D:
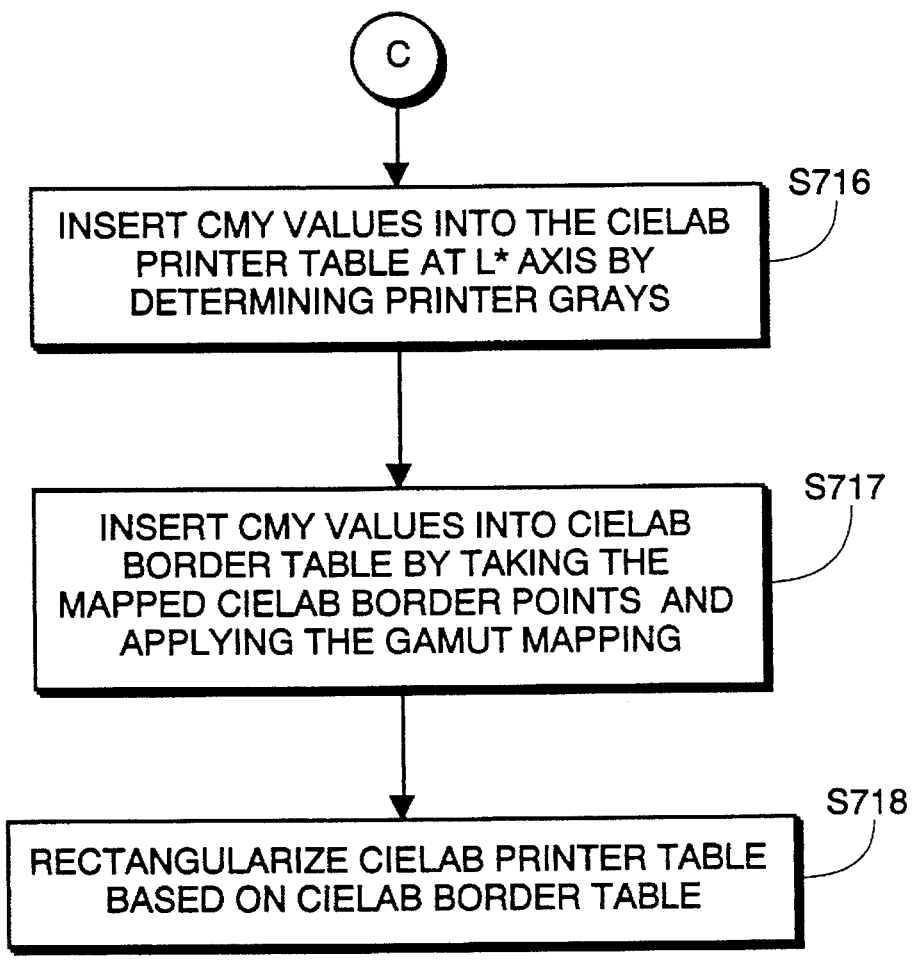
Figure 7A:
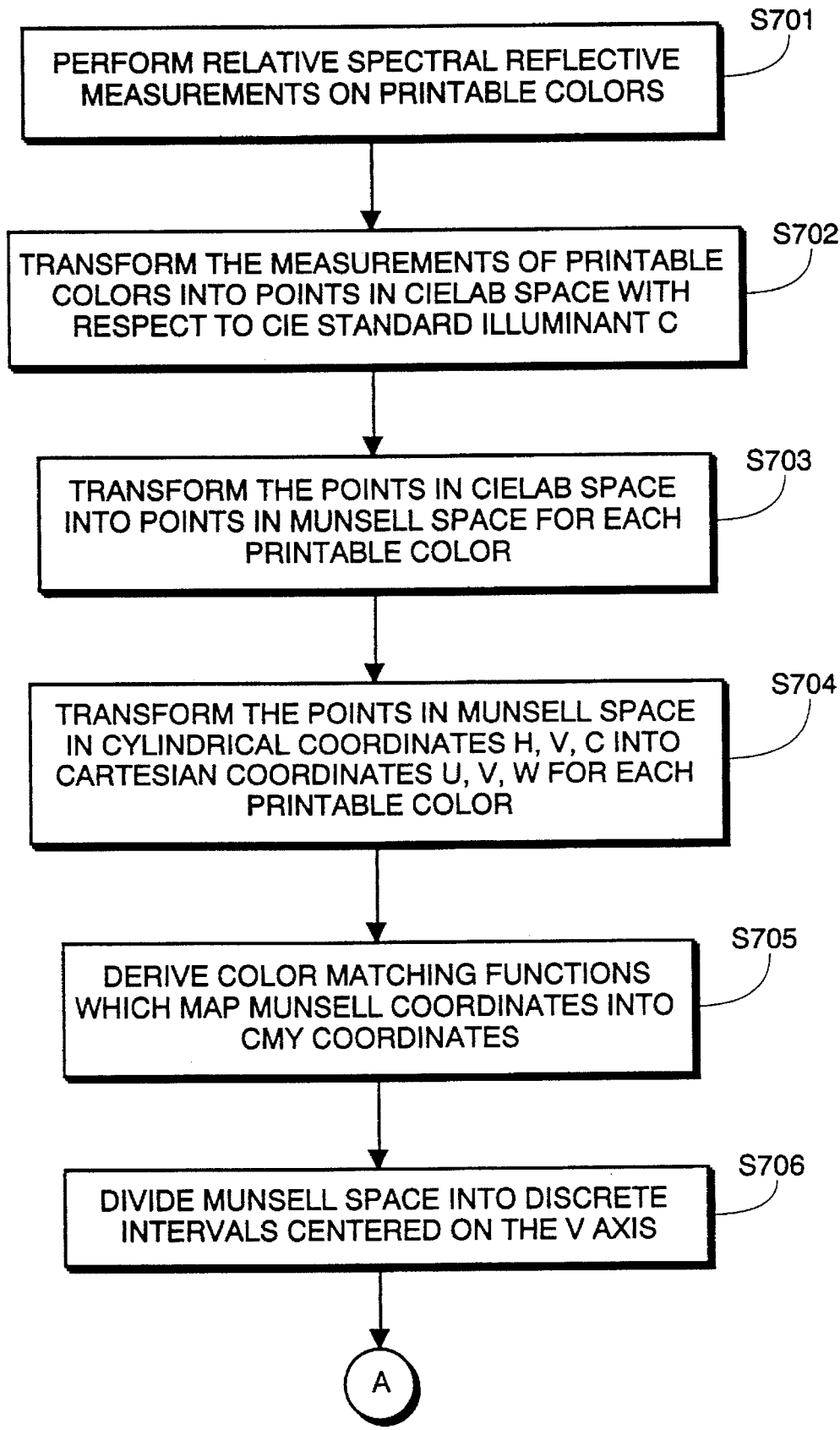
Figure 7B:
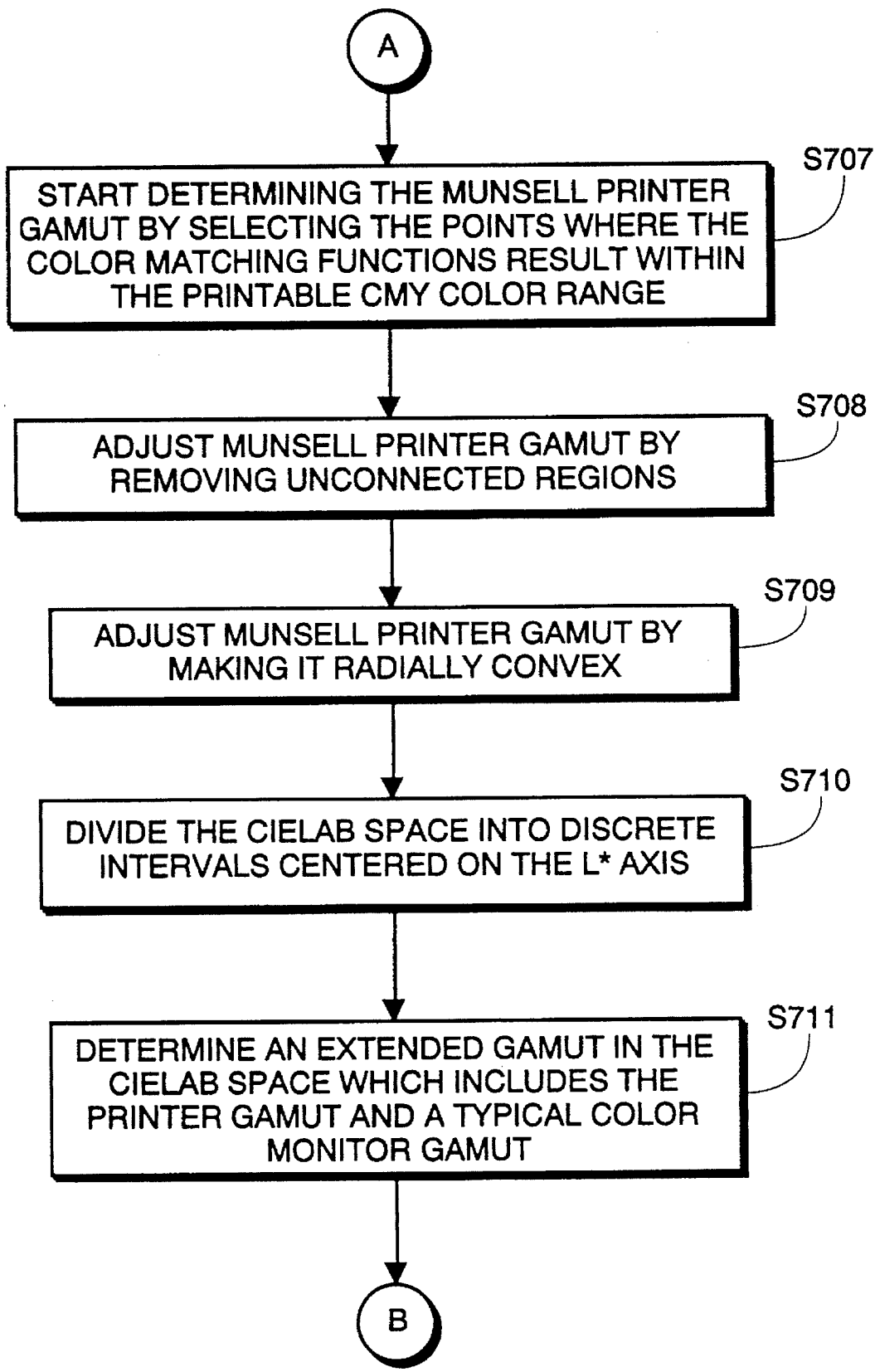
Figure 7C:
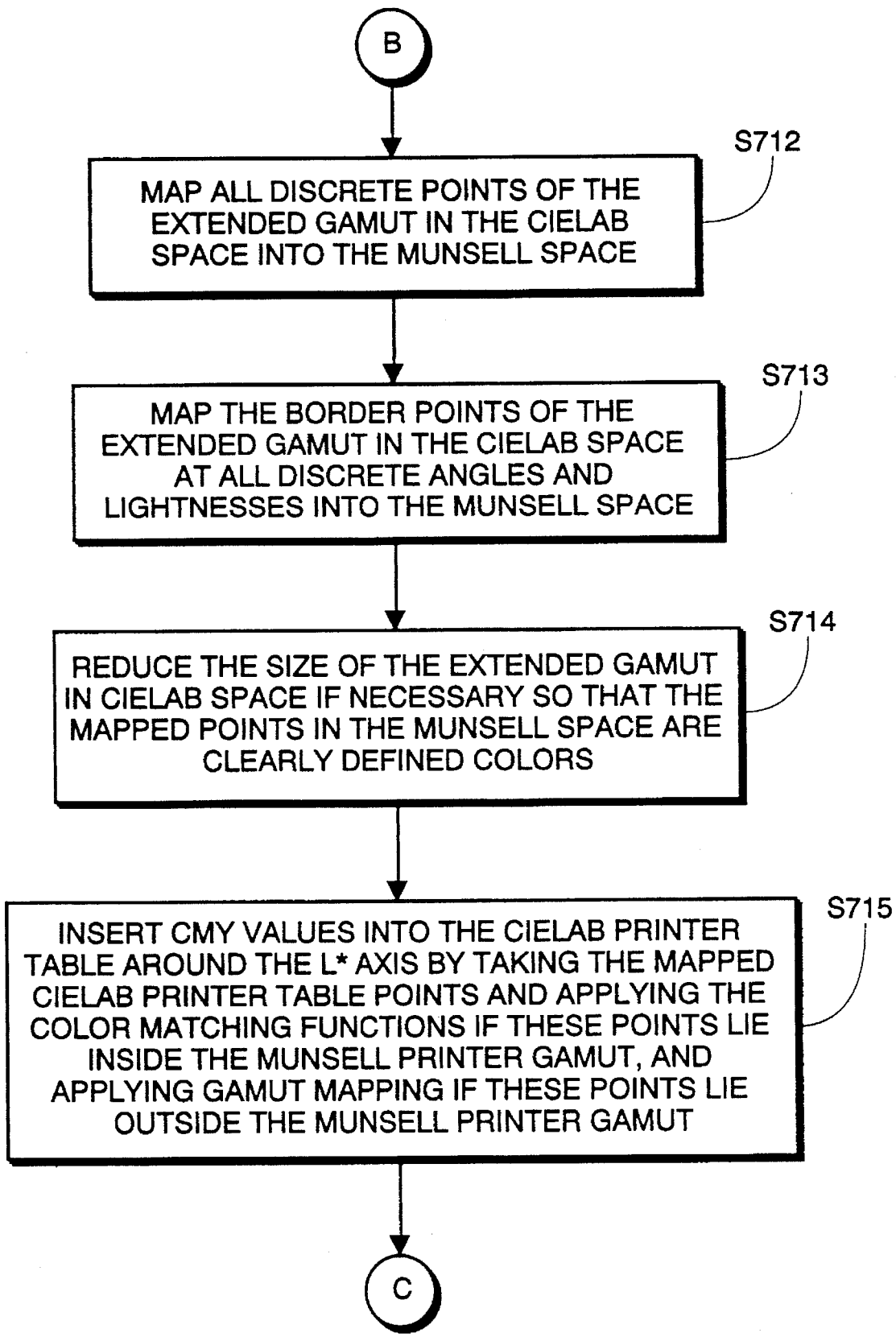

FIGS. 7(a)–7(d) when taken together as shown in FIG. 7, comprise a flow diagram for describing how the printer table 26a and the border table 26b is constructed. The flow procedures shown in FIGS. 7(a)–7(d) need only be performed once to derive printer tables and border tables for each printer. The printer tables are derived once by a manufacturer, to be used in a printer driver which is sold to end users as part of a printer. The printer tables may be in the form of software and/or hardware.

The printer and border tables are CIELAB printer tables and CIELAB border tables because the RGB values received from an input device such as a scanner are generally transformed into CIELAB coordinates. However, the CMY values which are inserted into the CIELAB printer table and the CIELAB border table are computed in the Munsell space where hue planes are straight, to exactly preserve the hue by merely preserving the hue angle.

Figure 8:
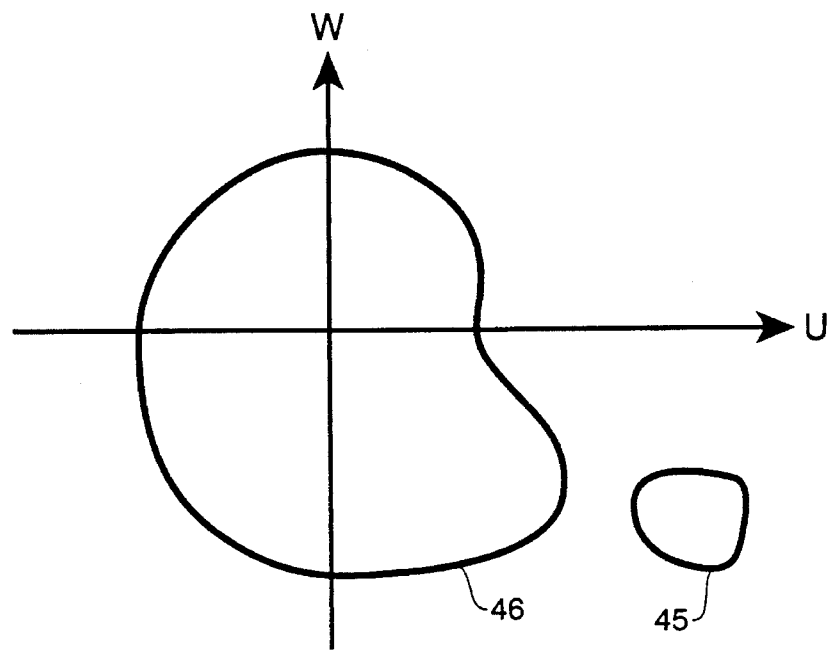
FIG. 8 shows how unconnected regions are removed from the Munsell printer table.

The steps shown in the flow diagrams of FIG. 8 may be stored program instructions which are operable in a CPU such as the CPU 20 shown in FIG. 5, or the steps may be executed entirely in a special purpose hardware apparatus.

In step S701, relative spectral reflectance measurements are performed on the range of colors printable by printer 40. Preferably, this is achieved by printing a very large subset, or a complete set, of all colors printable by printer 40. For example, in the printer used in the present embodiment, each of the CMY and K values may be printed in 65 gradations ranging numerically from 0 to 64. A subset of about one quarter of those values, for each color, are printed. Thus, for example, 17 C values are printed, namely numerical values 0, 4, 8, 12, . . . 64, and 17 M values are printed, and 17 Y values are printed. All possible combinations of those 17 CMY values are printed, yielding 17×17×17=4,913 color patches.

In addition to the foregoing colors, all possible gray values, in this case 48 additional gray values over the 17 already printed, are also printed.

With the foregoing sampling of the printer gamut, it will be seen that pure gray colors are printed together with hued colors. Whatever method of sampling is used, this property of pure gray printing should be preserved since proper gray reproduction is a desirable property in color reproduction.

Relative spectral reflectance measurements are performed on each of the 4,913 color patches and 48 additional gray patches.

Step S702 transforms the measurements of printable colors into points in the CIELAB space with respect to CIE standard illuminant C in L*, a* and b* coordinates which are transformed into H, V, and C cylindrical coordinates in Munsell space in step S703.

In step S704, the cylindrical H, V, C coordinates in Munsell space are transformed to U, V, W cartesian coordinates, where the U, W plane is orthogonal to the V axis, with U pointing in the direction of the Munsell hue 10RP and W pointing in the direction of Munsell hue 5Y.

Step S705 derives color mapping functions which map the Munsell coordinates into primary color coordinates, such as CMY coordinates. In the present embodiment, a cubic least square fit from Munsell space into CMY space was chosen. That is, using well-known least square fitting techniques, coefficients $c_0$ through $c_{19}$, $m_0$ through $m_{19}$, and $Y_0$ through $Y_{19}$ were derived to give the best fit, in the least squared sense, to the printable colors measured in step S701 and transformed in step S702:

$$C = c_0 + c_1V + c_2U + c_3W + c_4V^2 + c_5U^2 + c_6W^2 + \qquad (1)$$
$$c_7VU + c_8VW + c_9UW + c_{10}V^3 + c_{11}U^3 + c_{12}W^3 + c_{13}V^2U +$$
$$c_{14}VU^2 + c_{15}V^2W + c_{16}VW^2 + c_{17}U^2W + c_{18}UW^2 + c_{19}VUW$$

$$M = m_0 + m_1V + m_2U + m_3W + m_4V^2 + m_5U^2 + m_6W^2 + \qquad (2)$$
$$m_7VU + m_8VW + m_9UW + m_{10}V^3 + m_{11}U^3 + m_{12}W^3 +$$
$$m_{13}V^2U + m_{14}VU^2 + m_{15}V^2W + m_{16}VW^2 + m_{17}U^2W +$$
$$m_{18}UW^2 + m_{19}VUW$$

$$Y = y_0 + y_1V + y_2U + y_3W + y_4V^2 + y_5U^2 + y_6W^2 + \qquad (3)$$
$$y_7VU + y_8VW + y_9UW + y_{10}V^3 + y_{11}U^3 + y_{12}W^3 + y_{13}V^2U +$$
$$y_{14}VU^2 + y_{15}V^2W + y_{16}VW^2 + y_{17}U^2W + y_{18}UW^2 + y_{19}VUW$$

In step S705, any mathematical function which fits the measurements taken in step S801 from the device independent coordinate space to CMY coordinate space may be used. Preferably, however, the mapping function includes smoothing so as to eliminate measurement irregularities that may have been encountered in step S701.

It may, in addition, be preferable to weight some of the points measured in step S701 prior to deriving mapping in step S705. For example, proper skin tone color reproduction is an important property of color printers. Accordingly, it may be desirable, in some circumstances, to weight colors in the area of skin tone colors more heavily than other colors.

In step S706, the device independent space, namely Munsell space, is divided into equally sized discrete intervals, one of the intervals including the V axis such as by being centered at the V axis.

The determining of the Munsell printer gamut is started in step S707 by determining the points where the color mapping functions result within the printable primary color range, i.e., the CMY values. The size of the intervals in the Munsell printer gamut should be made as small as possible. For example, it has been found that fine luminance gradations are more important than fine hue and saturation gradations. It has been determined that dividing the luminance axis into intervals of $\Delta V=0.1$ (value V ranges from 0 through 10) provides adequate value V gradation. On the other hand, such fine gradations are not ordinarily needed in hue and saturation, and therefore $\Delta U=\Delta W=0.4$ has been found to yield adequate hue and saturation gradations (U and W range from about −20 through +20 near the center (V=5) of the value V axis).

In addition to the foregoing considerations, it should also be observed that the Munsell printer gamut is not the same for each value V. Specifically, the gamut is relatively smaller at value V extremes and relatively larger at the center of the value axis.

In steps S708 and S709, the Munsell printer gamut is adjusted. In FIG. 8 it is shown that the color matching function used may give rise to false regions in the Munsell printer gamut, such as region 45, which is not within the true Munsell printer gamut 46. These artifacts are removed in step S708 by removing all regions that are not connected to the region around the V axis.

Figure 9:
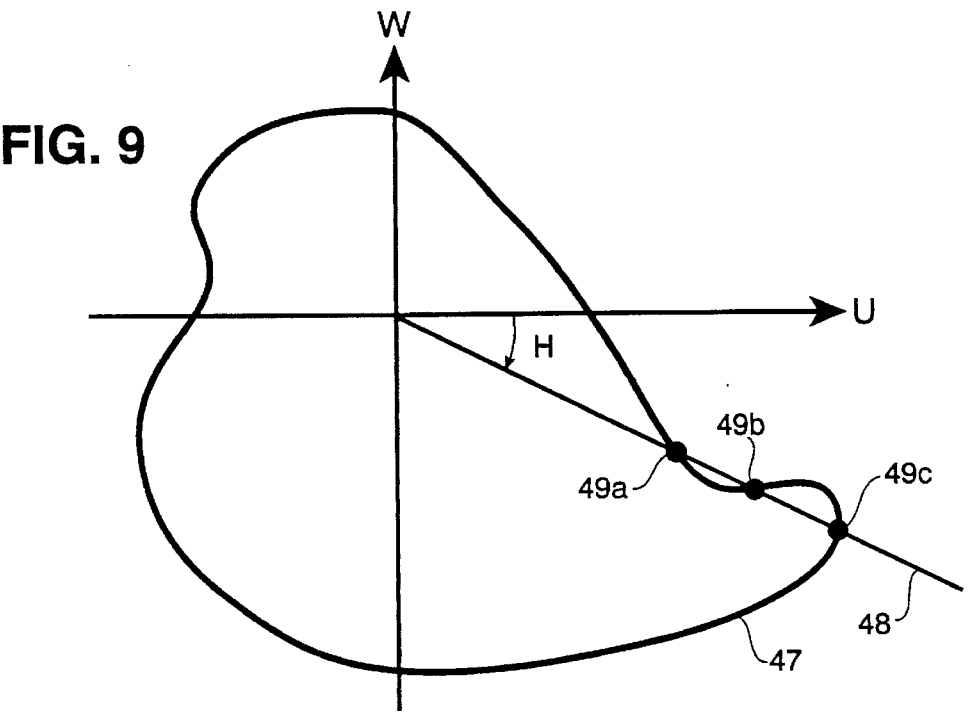
FIG. 9 shows radially concave regions in the Munsell printer gamut.

In FIG. 9 the Munsell printer gamut shown is not radially convex because each and every radial line from the V axis does not intersect border 47 at one and only one point. In particular, radial line 48 intersects border 47 at three points 49a, 49b and 49c. The region between points 49a and 49b is a radial concavity and can cause the generation of inappropriate CMY values. Accordingly, in step S709, the values in the Munsell printer gamut are adjusted to make them radially convex.

Figure 10:
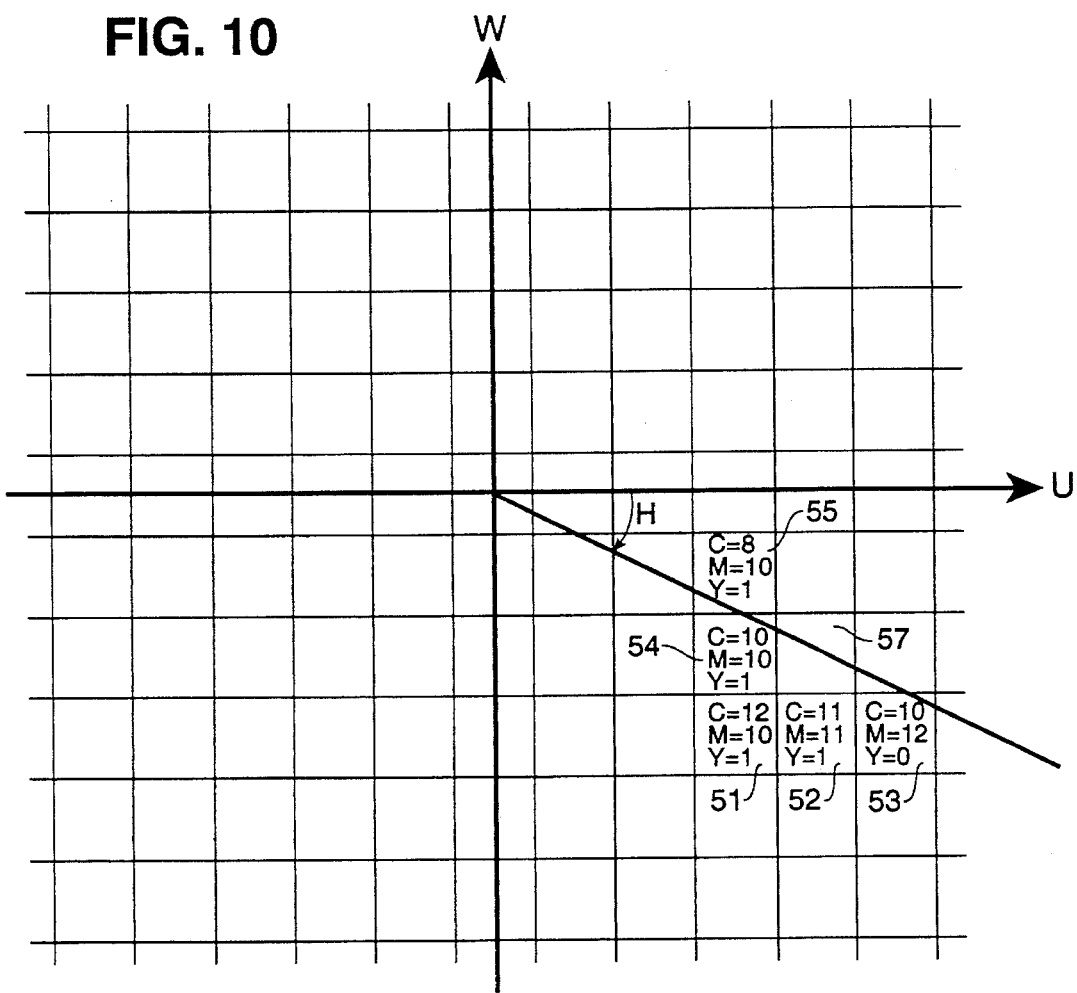
FIG. 10 illustrates how to remove concavities by making the Munsell printer table radially convex.

FIG. 10 illustrates this process. FIG. 10 shows the rectangular grid in the U and W axis for an arbitrary luminance value V. Cells 51 through 55 all include printable values within the Munsell printer gamut. However, cell 57 is a radially concave cell because the color mapping functions result outside the primary color range in values C=9, M=11 and Y=−1, and the radial line at angle H crosses two cells in the Munsell printer gamut (cells 53 and 55). Accordingly, a CMY value is assigned to cell 57 to make the table radially convex. The CMY value is selected by simply truncating the result to C=9, M=11 and Y=0, which places cell 57 inside the primary color range.

The printer table 26a and border table 26b provide CMY values in a device independent space, namely the CIELAB space. Prior to later insertion of CMY values into these tables, the CIELAB space must be divided into equally sized discrete intervals, one of the intervals including the L* axis such as by being centered at the L* axis. In step S710 the CIELAB space is so divided.

In step S711, the extended gamut in the CIELAB space is determined by first determining the printer gamut in the CIELAB space and then selecting the extended gamut to be slightly larger than the printer gamut and a typical color monitor gamut. The printer gamut in the CIELAB space is determined by applying the color mapping functions which map the CIELAB coordinates into primary color coordinates, i.e. CMY coordinates, and making the CIELAB printer gamut connected to the L* axis and radially convex.

Figure 11:
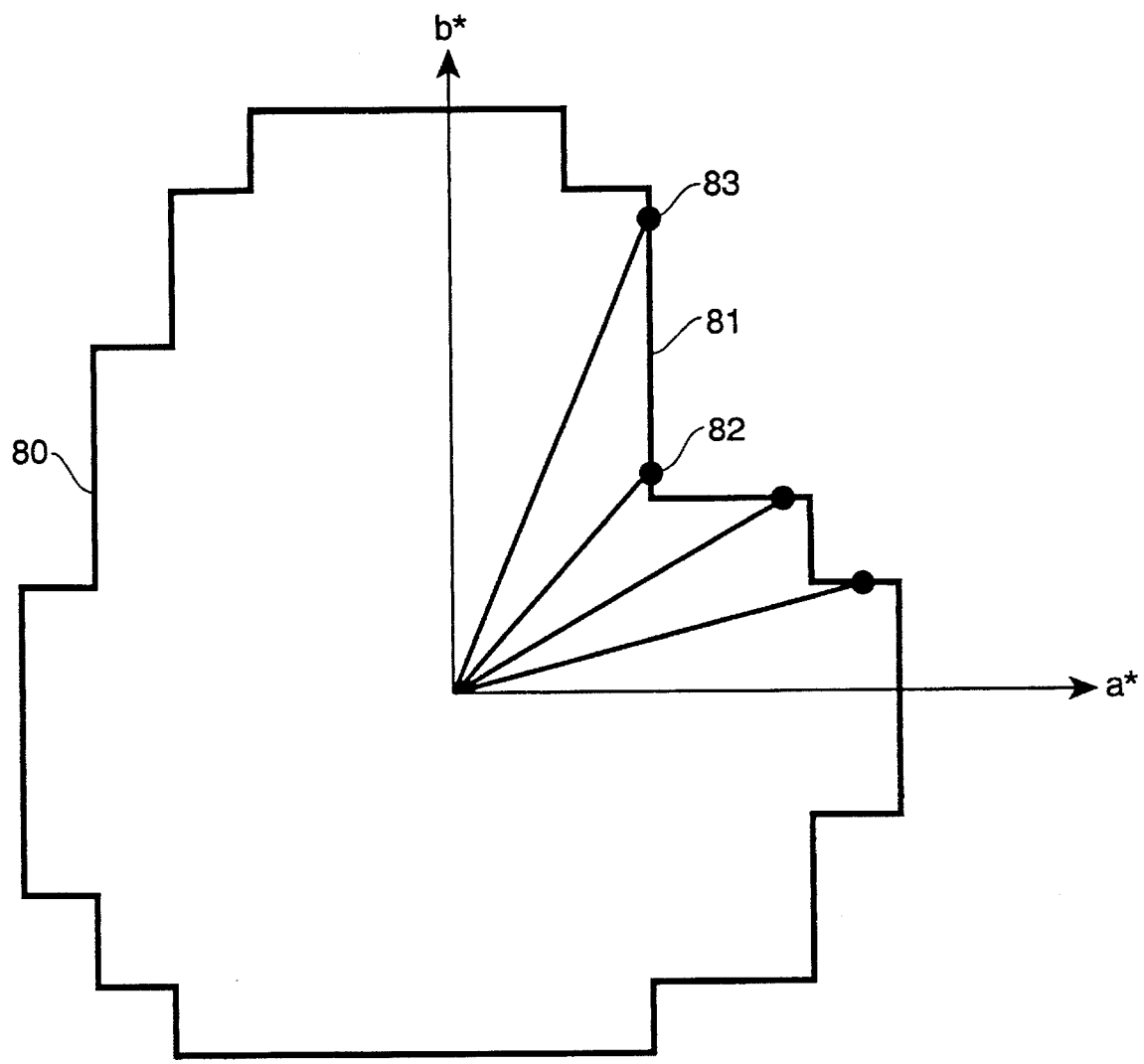
FIG. 11 illustrates how the border points of the extended gamut in CIELAB space are chosen to determine the border table.

In step S712 all discrete points of the extended gamut in the CIELAB space are mapped into the Munsell Space. In step S713 the border points of the extended gamut in the CIELAB space are mapped at all discrete angles and lightnesses into the Munsell space. FIG. 11 shows the border points of the extended gamut 80 in the CIELAB space. In areas like the area 81 at the border of the extended gamut 80 between points 82 and 83, the saturation changes too much. To avoid this large saturation change when going from one discrete angle to the next, sufficiently fine angle changes have to be chosen. Increments of 1° have been found to be sufficiently fine.

In step S714 the size of the extended gamut in the CIELAB space is reduced, if necessary, so that the mapped points in the Munsell space are clearly defined Munsell colors, which means that they lie within the area of the Munsell color patches, or within the area of extrapolated Munsell colors. The extrapolation of Munsell colors is described in the "Final Report On The O.S.A. Subcommittee On The Spacing Of Munsell Colors" by Newhall, S. et al., *J. Opt. Soc. Am.*, 33,7(1943).

At step S715 primary color values, i.e. CMY values are inserted into the CIELAB printer table around the L* axis by taking the mapped CIELAB printer table points and applying the color mapping functions to the mapped CIELAB points that lie inside the Munsell printer gamut, and applying gamut mapping to the mapped CIELAB points in Munsell space that lie outside the Munsell printer gamut. The gamut mapping maps a color point in the Munsell space which lies outside the Munsell printer gamut at a constant angle to a color of the same hue at the border of the Munsell printer gamut. Since gamut mapping takes place in the Munsell space, the hue is exactly preserved by simply preserving the hue angle.

Figure 12:
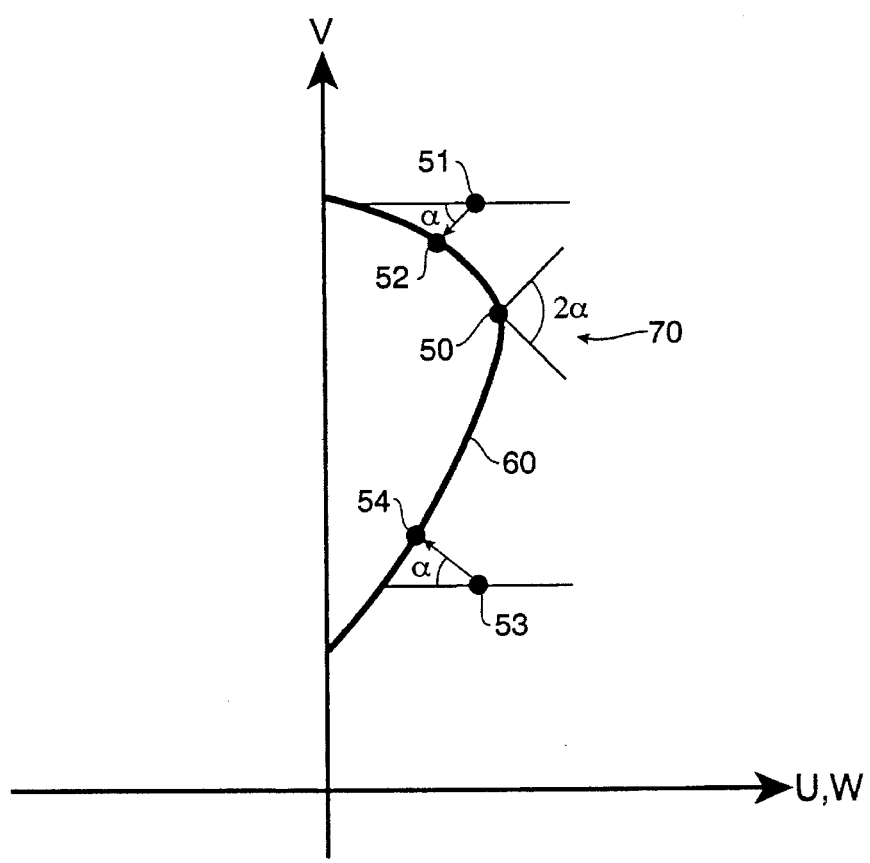
FIG. 12 shows the gamut mapping in the Munsell space.

How gamut mapping is performed may be seen by referring to FIG. 12. In FIG. 12 a hue plane in the Munsell space is shown, and 60 is the border of the printer gamut. Each mapped point in the Munsell space that lies outside the Munsell printer gamut 60, such as the point 51 is gamut mapped at a constant angle α to a color of the same hue at a point on the border 60, such as point 52. The gamut mapping assigns to point 51 the CMY color of point 52, which is determined by applying the color mapping functions to point 52. Likewise, a mapped point 53 outside the Munsell printer gamut 60 is gamut mapped at the constant angle α to a color of the same hue at point 54 on the border 60. The gamut mapping assigns to point 53 the CMY color of point 54, which is determined by applying the color mapping functions to point 54. The angle α lies in the range of approximately 10° to 30° with respect to the lightnesses plane at the points 51 or 53.

Within the displayed hue plane, point 50 denotes the point of maximum saturation at the border 60 of the Munsell printer gamut. For points above the point 50, such as the point 51, the angle α extends downwardly; and for points below the point 50, such as the point 53, the angle α extends upwardly. All mapped points in the wedge 70, subtended by the angle 2α from the point 50 are gamut mapped to the color at point 50. The gamut mapping assigns to all points in the wedge 70 the CMY color of point 50, which is determined by applying the color mapping functions to point 50. Since the gamut mapping preserves the hue angle in Munsell space, the hue is exactly preserved.

At Step S716, CMY values are inserted into the printer table at the L* axis by determining the printer grays.

At step S717, CMY values are inserted into the border table by taking the mapped CIELAB border points of the extended gamut and applying the gamut mapping as shown in FIG. 11. The border table lists one primary CMY color at all discrete angles and lightnesses for points outside the extended gamut in CIELAB space. These primary colors are determined by mapping the border points of the extended gamut in CIELAB space at all discrete angles and lightnesses into the Munsell space and applying the gamut mapping in the Munsell space as described relative to FIG. 12.

Figure 15:
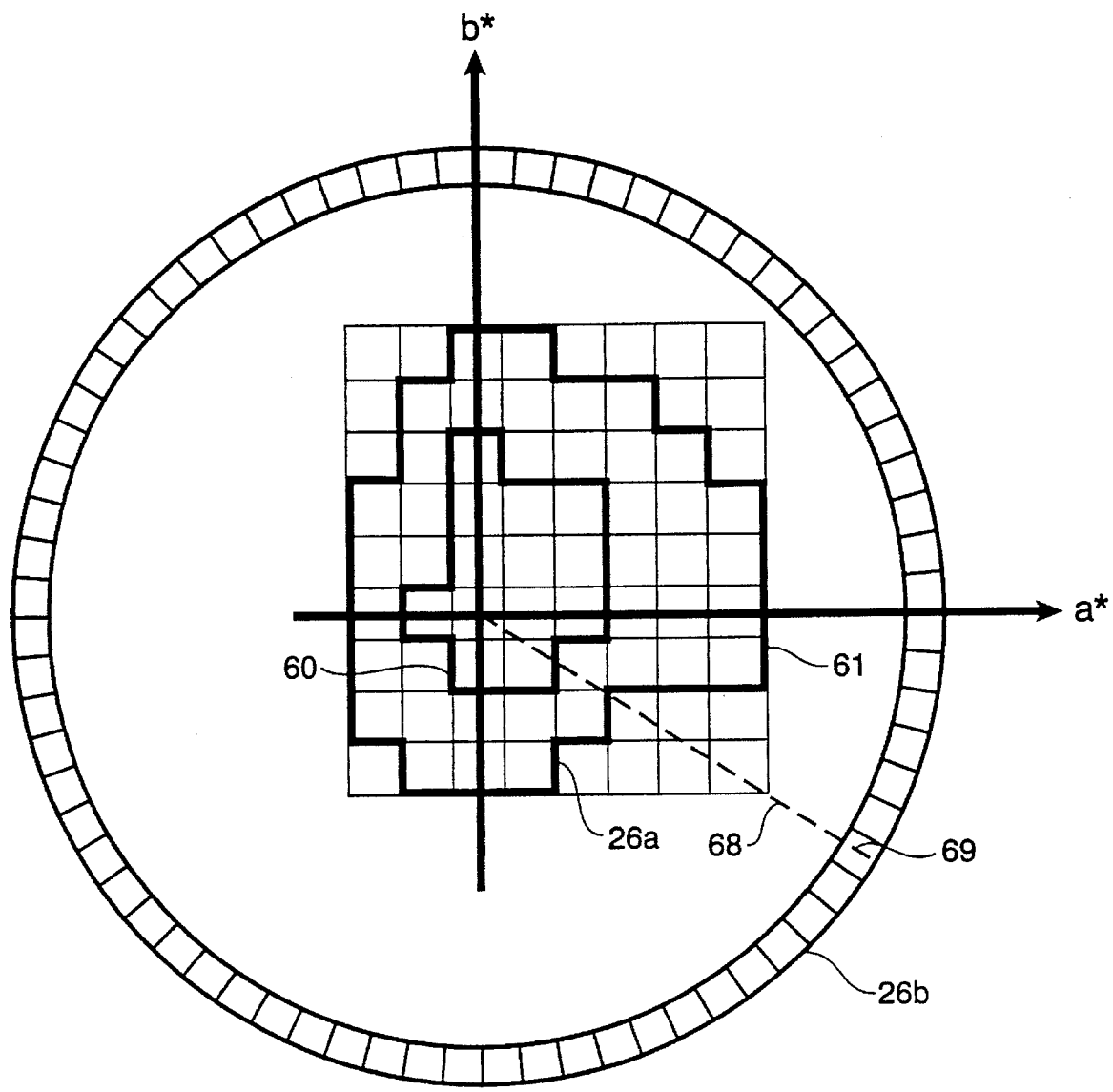
FIG. 15 shows the relation between the printer gamut, the extended gamut, the rectangular area of the printer table and the wheel-shaped border table in CIELAB space for an arbitrary luminance value L*.

FIG. 15 shows the correspondence of border tables and printer tables. Whereas printer table 26a is a rectangular grid for an arbitrary luminance value L*, border table 26b is arranged as a wheel centered at $a^*=b^*=0$. Individual cells in the border table are accessed by the angle θ in the a* b* plane which also corresponds to hue. Experimentally, it has been found that 1 degree increments, resulting in 360 cells in each border table, provides adequate gradation of hue. However, this gradation may be adjusted.

In step S718, the printer table is rectangularized. More specifically, until this step, CMY values have been inserted into the printer table only in areas within the extended gamut 61 which includes the printer gamut 60 (steps S710 and S715). In step S718, the remaining cells of the printer table such as cells like cell 68 in FIG. 15 are filled out by calculating the hue angle for each blank cell that remains in the printer table and by inserting the border table color at that hue angle as illustrated at 69 in FIG. 15.

Figure 14:
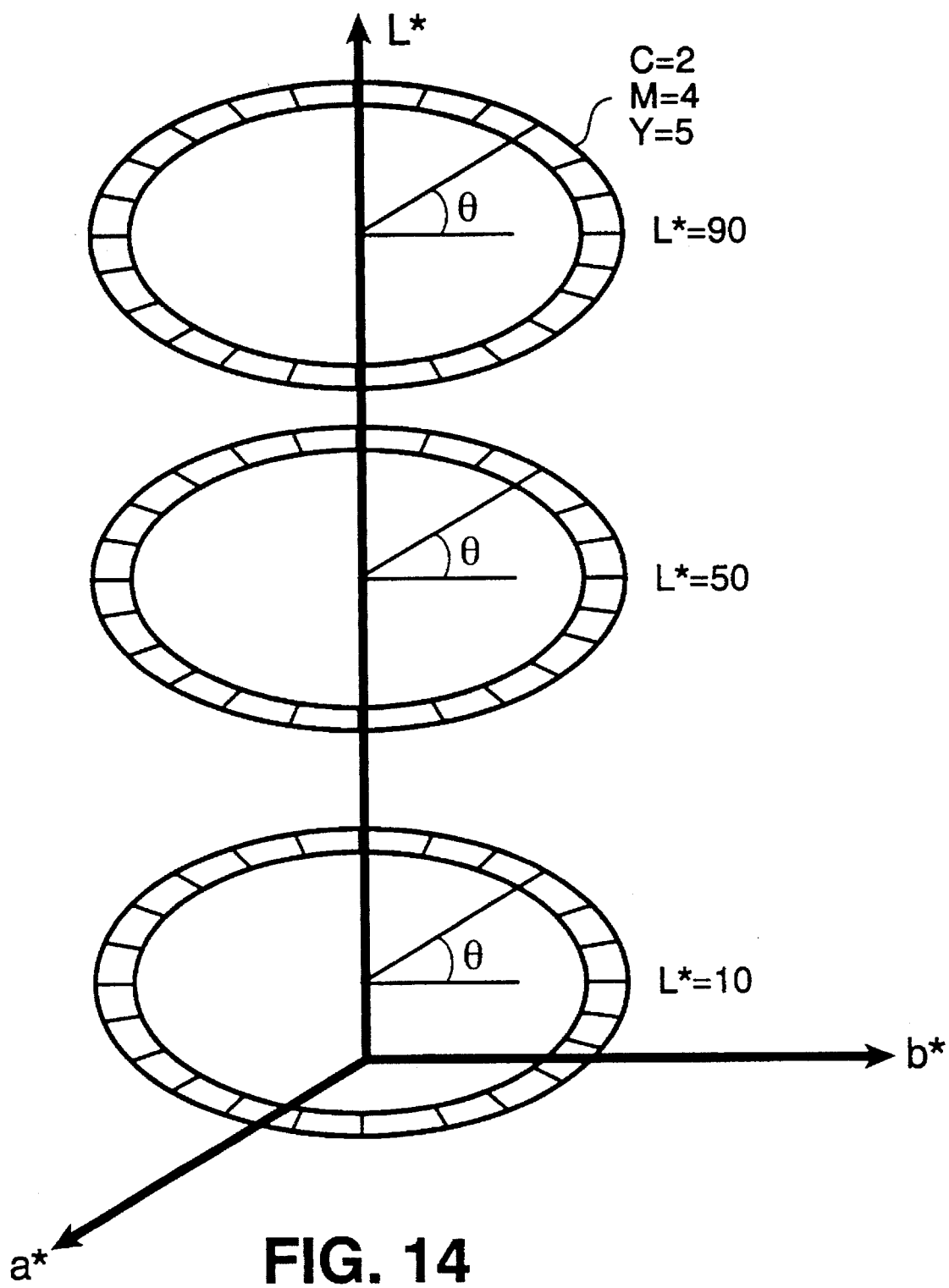
FIG. 14 illustrates the arrangement of a border table in CIELAB space.

Whereas the printer table was arranged as a rectangular grid in the a* b* axes for each luminance value, the border table is arranged in wheels with one wheel for each of the luminance values of the printer table. Thus, as shown in FIG. 14, a wheel-shaped border table is provided for each of the luminance values for which a printer table exists, which provides one border table in correspondence with each of the printer tables. The border tables contain plural cells which are accessed based on hue angle θ calculated as a function of the a* and b* coordinates, as follows:

$$\theta = \arctan(b^*/a^*)$$

Figure 13:
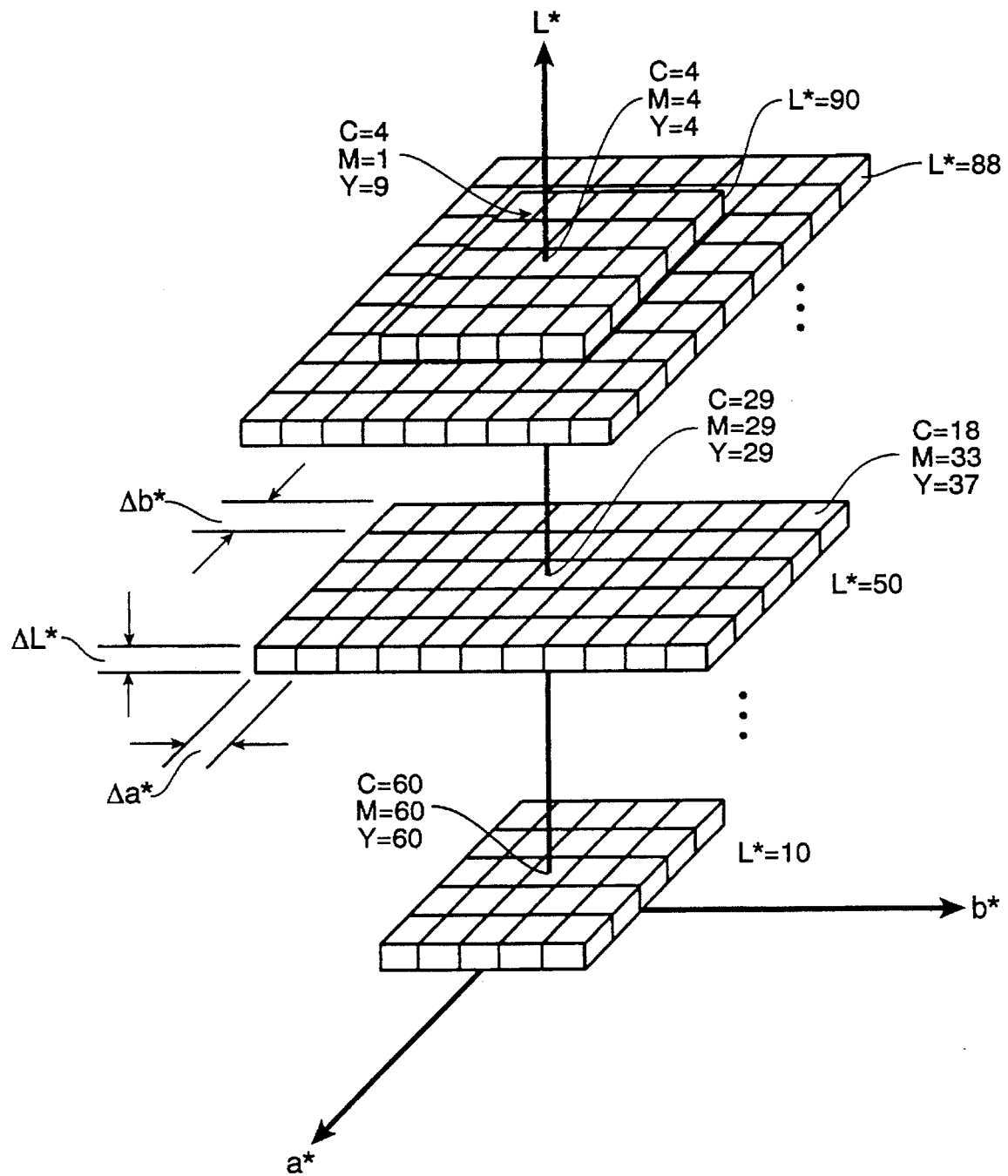
FIG. 13 illustrates a typical division of CIELAB space into a printer table.

FIG. 13 illustrates a typical division of CIELAB space into a printer table, although all luminance and hue gradations have not been shown to simplify the presentation. At relatively low luminance values such as $L^*=10$, a relatively small rectangular grid in the a* and b* axes is adequate to map the printer gamut. Similarly, at relatively high luminance values, such as $L^*=90$, a relatively small rectangular grid in the a* and b* axes is also adequate to store the printer gamut. However, at intermediate luminance values, such as that at $L^*=50$, a relatively larger rectangular grid in the a* and b* axes is required to map the printer gamut.

As further shown in FIG. 13, the rectangular grid at each luminance level includes the L* axis (in FIG. 13 it is centered on the L* axis). That is, there is a cell in the rectangular grid that corresponds exactly to $a^*=b^*=0$. That central point, namely $a^*=b^*=0$, corresponds to a pure gray color which, as mentioned above, is desirably reproduced as a pure gray color for proper color reproduction.

What is claimed is:

1. A method of constructing a printer table with a reduced Abney effect, comprising the steps of:

transforming measurements of printable colors into Munsell space;

deriving color mapping functions which map Munsell space coordinates into primary color coordinates in such a manner as to yield a straight hue plane which nevertheless reduces the Abney effect;

determining a Munsell printer gamut by selecting points in Munsell space where the color mapping functions result within a primary color range printable by the printer;

determining a CIELAB space extended gamut which includes a printer gamut and a typical color monitor gamut;

mapping all discrete points of the extended gamut in CIELAB space into the Munsell space; and inserting primary color values into said printer table by gamut mapping the mapped CIELAB points in Munsell space that lie outside the Munsell printer gamut, at a constant angle to a color of the same hue at a border of the printer gamut in Munsell space.

2. The method of claim 1, including the step of:

inserting additional primary color values into said printer table by taking the mapped CIELAB points and applying the color mapping functions to the mapped CIELAB points that lie inside the Munsell printer gamut.

3. The method of claim 2, including the steps of:

mapping border points of the extended gamut in CIELAB space into the Munsell space; and inserting primary color values into a border table by applying the gamut mapping in Munsell space to the mapped CIELAB border points.

4. A method of constructing a printer table with a reduced Abney effect, comprising the steps of:

transforming relative spectral reflectance measurements of printable colors into Munsell space;

deriving color mapping functions which map Munsell space coordinates into primary color coordinates in such a manner as to yield a straight hue plane which nevertheless reduces the Abney effect;

determining a Munsell printer gamut by selecting points in Munsell space where the color mapping functions result within a printable primary color range printable by the printer;

determining a CIELAB space extended gamut which includes the printer gamut and a typical color monitor gamut;

mapping all discrete points of the extended gamut in CIELAB space into the Munsell space; and inserting primary color values into said printer table by taking the mapped CIELAB points and applying the color mapping functions to the mapped CIELAB points that lie inside the Munsell printer gamut, and applying gamut mapping to the mapped CIELAB points in Munsell space that lie outside the Munsell printer gamut, wherein the gamut mapping maps a color point, in the Munsell space which lies outside the Munsell printer gamut, at a constant angle to a color of the same hue at a border of the Munsell printer gamut.

5. The method of claim 4, including the steps of:

mapping border points of the extended gamut in CIELAB space, at all discrete angles and lightnesses, into the Munsell space; and inserting primary color values into a border table by applying gamut mapping in Munsell space to the mapped CIELAB border points.

6. The method of claim 4, including the step of:

transforming the points in CIELAB space into points in Munsell space for each printable color.

7. A method of constructing a printer table, comprising the steps of:

transforming relative spectral reflectance measurements of printable colors into Munsell space;

deriving color mapping functions which map Munsell space coordinates into primary color coordinates in such a manner as to avoid the need to warp the hue plane in order to yield a straight hue plane;

determining a Munsell printer gamut by selecting points in Munsell space where the color mapping functions result within a primary color range printable by the printer;

determining a CIELAB space extended gamut which includes the printer gamut and a typical color monitor gamut;

mapping all discrete points of the extended gamut in CIELAB space into the Munsell space; and inserting primary color values into Said printer table by taking the mapped CIELAB points and applying the color mapping functions to the mapped CIELAB points that lie inside the Munsell printer gamut, and applying gamut mapping to the mapped CIELAB points in Munsell space that lie outside the Munsell printer gamut;.

mapping border points of the extended gamut in CIELAB space, at all discrete angles and lightness, into the Munsell space;

inserting primary color values into a border table by applying gamut mapping in Munsell space to the mapped CIELAB border points;

transforming the points in CIELAB space into points in Munsell space for each printable color; and transforming the points in Munsell space in cylindrical coordinates H, V, C into Cartesian coordinates U, V, W for each printable color, wherein the gamut mapping maps a color point, in the Munsell space which lies outside the Munsell printer gamut, at a constant angle to a color of the same hue at a border of the Munsell printer gamut.

8. The method of claim 7, including the step of:

dividing the Munsell space into discrete intervals centered on the V axis.

9. The method of claim 8, including the step of:

adjusting the Munsell printer gamut by removing unconnected regions from the Munsell printer gamut.

10. The method of claim 9, including the step of:

adjusting the Munsell printer gamut by making its radially convex.

11. The method of claim 10, including the step of:

dividing CIELAB space into discrete intervals centered on the L* axis.

12. The method of claim 11, including the step of:

reducing the size of the extended gamut in the CIELAB space, if necessary, so that the mapped points in Munsell space are clearly defined Munsell colors.

13. The method of claim 12, including the step of:

inserting primary color values into the printer table at the L* axis by determining printer grays.

14. The method of claim 13, including the step of:

inserting primary color values into a border table by taking the mapped CIELAB border points and applying gamut mapping.

15. The method of claim 14, including the step of:

rectangularizing the printer table based on the border table.

16. An apparatus for constructing a printer table with a reduced Abney effect, comprising:

means for transforming measurements of printable colors into Munsell space;

means for deriving color mapping functions which map Munsell space coordinates into primary color coordinates in such a manner as to yield a straight hue plane which nevertheless reduces the Abney effect;

means for determining a Munsell printer gamut by selecting points in Munsell space where the color mapping functions result within a printable primary color range printable by a printer;

means for determining a CIELAB space extended gamut which includes a printer gamut and a typical color monitor gamut;

means for mapping all discrete points of the extended gamut in CIELAB space into the Munsell space; and means for inserting primary color values into said printer table by gamut mapping the mapped CIELAB points in Munsell space that lie outside the Munsell printer gamut, at a constant angle to a color of the same hue at a border of the printer gamut in Munsell space.

17. The apparatus of claim 16, including:

means for inserting additional primary color values into said printer table by taking the mapped CIELAB points and applying the color mapping functions to the mapped CIELAB points that lie inside the Munsell printer gamut.

18. The method of claim 17, including:

means for mapping border points of the extended gamut in CIELAB space into the Munsell space; and means for inserting primary color values into a border table by applying the gamut mapping in Munsell space to the mapped CIELAB border points.

19. Apparatus for constructing a printer table with a reduced Abney effect, comprising:

means for transforming relative spectral reflectance measurements of printable colors into Munsell space;

means for deriving color mapping functions which map Munsell space coordinates into primary color coordinates in such a manner as to yield a straight hue plane which nevertheless reduces the Abney effect;

means for determining a Munsell printer gamut by selecting points in Munsell space where the color mapping functions result within a printable primary color range printable by a printer;

determining a CIELAB space extended gamut which includes the printer gamut and a typical color monitor gamut;

means for mapping all discrete points of the extended gamut in CIELAB space into the Munsell space; and means for inserting primary color values into said printer table by taking the mapped CIELAB points and applying the color mapping functions to the mapped CIELAB points that lie inside the Munsell printer gamut, and applying gamut mapping to the mapped CIELAB points in Munsell space that lie outside the Munsell printer gamut, wherein the gamut mapping maps a color point, in the Munsell space which lies outside the Munsell printer gamut, at a constant angle to a color of the same hue at a border of the Munsell printer gamut.

20. The apparatus of claim 19, including:

means for mapping border points of the extended gamut in CIELAB space, at all discrete angles and lightnesses, into the Munsell space; and means for inserting primary color values into a border table by applying gamut mapping in Munsell space to the mapped CIELAB border points.

21. The apparatus of claim 19, including:

means for transforming the points in CIELAB space into points in Munsell space for each printable color.

22. Apparatus for constructing a printer table, comprising:

means for transforming relative spectral reflectance measurements of printable colors into Munsell space;

means for deriving color mapping functions which map Munsell space coordinates into primary color coordinates;

means for determining a Munsell printer gamut by selecting points in Munsell space where the color mapping functions result within the printable primary color range;

determining a CIELAB space extended gamut which includes the printer gamut and a typical color monitor gamut;

means for mapping all discrete points of the extended gamut in CIELAB space into the Munsell space; and means for inserting primary color values into said printer table by taking the mapped CIELAB points and applying the color mapping functions to the mapped CIELAB points that lie inside the Munsell printer gamut, and applying gamut mapping to the mapped CIELAB points in Munsell space that lie outside the Munsell printer gamut;

means for transforming the points in CIELAB space into points in Munsell space for each printable color; and means for transforming the points in Munsell space in cylindrical coordinates H, V, C into Cartesian coordinates U, V, W for each printable color, wherein the gamut mapping maps a color point, in the Munsell space which lies outside the Munsell printer gamut, at a constant angle to a color of the same hue at the border of the Munsell printer gamut.

23. The apparatus of claim 22, further comprising:

means for dividing the Munsell space into discrete intervals centered on the V axis.

24. The apparatus of claim 23, further comprising:

means for adjusting the Munsell printer gamut by removing unconnected regions from the Munsell printer gamut.

25. The apparatus of claim 24, further comprising:

means for adjusting the Munsell printer by making it radially convex.

26. The apparatus of claim 25, further comprising:

means for dividing CIELAB space into discrete intervals centered on the L* axis.

27. The apparatus of claim 26, further comprising:

means for reducing the size of the extended gamut in the CIELAB space, if necessary, so that the mapped points in Munsell space are clearly defined Munsell colors.

28. The apparatus of claim 27, further comprising:

means for inserting primary color values into the printer table at the L* axis by determining printer grays.

29. The apparatus of claim 28, further comprising:

means for inserting primary color values into a border table by taking the mapped CIELAB border points and applying gamut mapping.

30. The apparatus of claim 29, further comprising:

means for rectangularizing the printer table based on the border table.

31. The method of claim 6, including the step of transforming the points in Munsell space in cylindrical coordinates H, V, C into Cartesian coordinates U, V, W for each printable color.

32. The method of claim 31, including the step of dividing the Munsell space into discrete intervals centered on the V axis.

33. The method of claim 32, including the step of adjusting the Munsell printer gamut by removing unconnected regions from the Munsell printer gamut.

34. The method of claim 33, including the step of adjusting the Munsell printer gamut by making its radially convex.

35. The method of claim 34, including the step of dividing CIELAB space into discrete intervals centered on the L* axis.

36. The method of claim 35, including the step of reducing the size of the extended gamut in the CIELAB space, if necessary, so that the mapped points in Munsell space are clearly defined Munsell colors.

37. The method of claim 36, including the step of inserting primary color values into the printer table at the L* axis by determining printer grays.

38. The method of claim 37, including the step of inserting primary color values into a border table by taking the mapped CIELAB border points and applying gamut mapping.

39. The method of claim 38, including the step of:
rectangularizing the printer table based on the border table.

40. The apparatus of claim 21, further comprising means for transforming the points in Munsell space in cylindrical coordinates H, V, C into Cartesian coordinates U, V, W for each printable color.

41. The apparatus of claim 40, further comprising means for dividing the Munsell space into discrete intervals centered on the V axis.

42. The apparatus of claim 41, further comprising means for adjusting the Munsell printer gamut by removing unconnected regions from the Munsell printer gamut.

43. The apparatus of claim 42, further comprising means for adjusting the Munsell printer by making it radially convex.

44. The apparatus of claim 43, further comprising means for dividing CIELAB space into discrete intervals centered on the L* axis.

45. The apparatus of claim 44, further comprising means for reducing the size of the extended gamut in the CIELAB space, if necessary, so that the mapped points in Munsell space are clearly defined Munsell colors.

46. The apparatus of claim 45, further comprising means for inserting primary color values into the printer table at the L* axis by determining printer grays.

47. The apparatus of claim 46, further comprising means for inserting primary color values into a border table by taking the mapped CIELAB border points and applying gamut mapping.

48. The apparatus of claim 47, further comprising means for rectangularizing the printer table based on the border table.

* * * * *

UNITED STATES PATENT AND TRADEMARK OFFICE
CERTIFICATE OF CORRECTION

PATENT NO. : 5,574,666
DATED : November 12, 1996
INVENTOR(S) : Brigitte Ruetz, Gesualdo Alesii, Timothy L. Kohler.

It is certified that error appears in the above-indentified patent and that said Letters Patent is hereby corrected as shown below:

COVER PAGE

Under [75], Inventors, change "Timothy I. Kohler" to --Timothy L. Kohler--.

Under [56], References Cited, U.S. Patent Documents, change "4,751,535   10/1986   Myers" to --4,751,535   6/1988   Myers--.

Under [56], References Cited, Other Publications, change "`color Fundamentals'" to --"Color Fundamentals"--.

UNITED STATES PATENT AND TRADEMARK OFFICE
CERTIFICATE OF CORRECTION

PATENT NO. : 5,574,666
DATED : November 12, 1996
INVENTOR(S) : Brigitte Ruetz, Gesualdo Alesii, Timothy L. Kohler It is certified that error appears in the above-indentified patent and that said Letters Patent is hereby corrected as shown below:

```
Column  2, line 25, change "exhibited" to --exhibit--;
           line 28, change "per," to -- per- --; and
           line 34, change "Constant" to --constant--.

Column 12, line 6, change "Said" to --said--; and
           line 35, change "its" to --it--.

Column 14, line 64, change "its" to --it--.

Column 16, line 2, after "printer" insert --gamut--.
```

Signed and Sealed this

Tenth Day of June, 1997

BRUCE LEHMAN

*Attest:*

*Attesting Officer*              *Commissioner of Patents and Trademarks*